United States Patent
Hara et al.

[19]
[11] Patent Number: 6,141,863
[45] Date of Patent: Nov. 7, 2000

[54] FORCE-CONTROLLED ROBOT SYSTEM WITH VISUAL SENSOR FOR PERFORMING FITTING OPERATION

[75] Inventors: Ryuichi Hara, Fujiyoshida; Kazunori Ban, Oshino-mura, both of Japan

[73] Assignee: Fanuc Ltd., Yamanashi, Japan

[21] Appl. No.: 09/091,730

[22] PCT Filed: Oct. 24, 1997

[86] PCT No.: PCT/JP97/03878

§ 371 Date: Jun. 24, 1998

§ 102(e) Date: Jun. 24, 1998

[87] PCT Pub. No.: WO98/17444

PCT Pub. Date: Apr. 30, 1998

[30] Foreign Application Priority Data

Oct. 24, 1996 [JP] Japan .................................. 8-299250

[51] Int. Cl.[7] .................................................. B23P 21/00
[52] U.S. Cl. .................................. 29/714; 29/718; 29/720
[58] Field of Search ........................ 29/407.04, 407.08, 29/407.09, 407.1, 702, 709, 720, 714, 718; 901/47

[56] References Cited

U.S. PATENT DOCUMENTS

| | | |
|---|---|---|
| 3,893,217 | 7/1975 | Edmond . |
| 4,453,085 | 6/1984 | Pryor . |
| 4,573,271 | 3/1986 | Hamilton et al. . |
| 4,575,304 | 3/1986 | Nakagawa et al. . |
| 4,628,464 | 12/1986 | McConnell . |
| 4,654,949 | 4/1987 | Pryor . |
| 4,791,588 | 12/1988 | Onda et al. . |
| 4,833,383 | 5/1989 | Skarr et al. . |
| 4,835,450 | 5/1989 | Suzuki . |
| 4,884,329 | 12/1989 | Higuchi . |
| 4,894,901 | 1/1990 | Soderberg . |
| 5,148,591 | 9/1992 | Pryor . |
| 5,159,745 | 11/1992 | Kato . |
| 5,319,443 | 6/1994 | Watanabe et al. . |
| 5,323,470 | 6/1994 | Kara et al. . |
| 5,368,428 | 11/1994 | Hussey et al. . |
| 5,608,847 | 3/1997 | Pryor . |

FOREIGN PATENT DOCUMENTS

| | | | |
|---|---|---|---|
| 2591-929 | 6/1987 | France | ...................................... 901/47 |
| 2549898 | 5/1977 | Germany | ................................. 901/47 |
| 1-107933 | 4/1989 | Japan . | |
| 5-152794 | 6/1993 | Japan | ...................................... 29/720 |
| 6-175716 | 6/1994 | Japan . | |
| 7-96427 | 4/1995 | Japan . | |
| 2128772 | 5/1984 | United Kingdom | ...................... 901/47 |

Primary Examiner—Irene Cuda
Attorney, Agent, or Firm—Staas & Halsey LLP

[57] ABSTRACT

A force-controlled robot system with a visual sensor capable of performing a fitting operation automatically with high reliability. A force sensor attached to a wrist portion of a robot detects force in six axis directions for force control, and transmits the results of detection to a robot controller. Position and orientation of a convex portion of a fit-in workpiece held by claws of a robot hand and position and orientation of a concave position of a receiving workpiece positioned by a positioning device are detected by a three-dimensional visual sensor including a structured light unit SU and an image processor in the robot controller, and a robot position to start an inserting action is corrected. Then, the convex portion is inserted into the concave portion under the force control. After the inserting action completes, it is determined whether or not the insertion state of the fit-in workpiece in the receiving workpiece is normal.

6 Claims, 7 Drawing Sheets

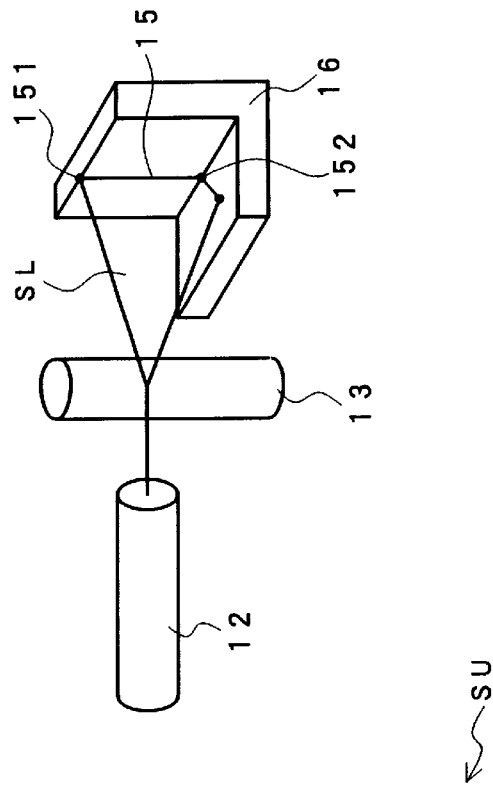
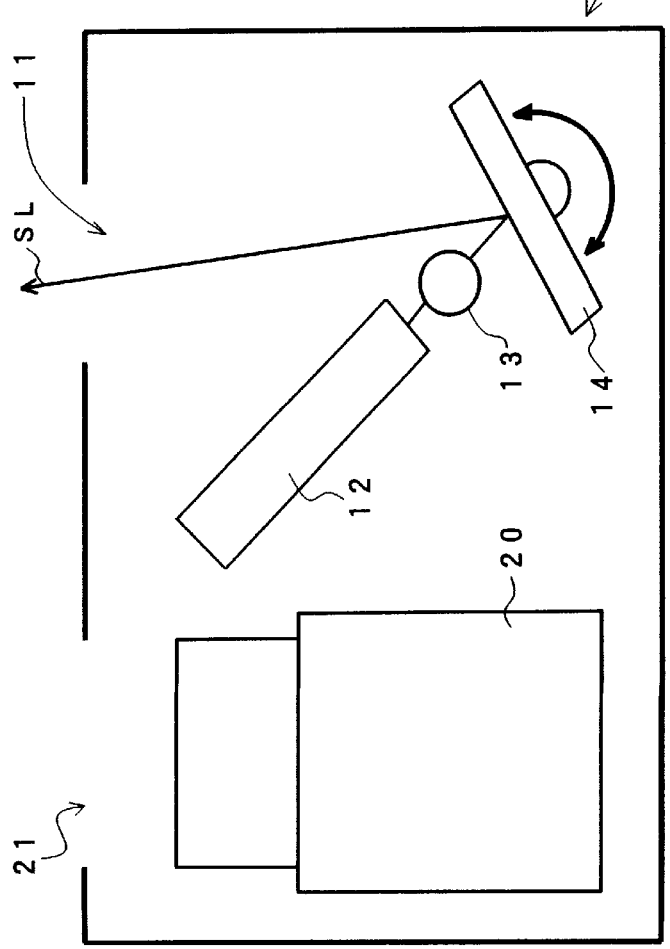
FIG. 2b
FIG. 2a

FORCE-CONTROLLED ROBOT SYSTEM WITH VISUAL SENSOR FOR PERFORMING FITTING OPERATION

TITLE OF THE INVENTION

FORCE-CONTROLLED ROBOT SYSTEM WITH VISUAL SENSOR FOR PERFORMING FITTING OPERATION

1. Field of the Invention

The present invention relates to a technology of automating a fitting operation required in an assembling process of parts and the like, and more specifically to a force-controlled robot system with a visual sensor in which function of the visual sensor is utilized before and after an inserting action of the force-controlled robot.

2. Description of the Related Art

Fitting operation is one of the basic operations involved in most of assembling processes, and automation of the fitting operation using a robot is already carried out. In the fitting operation with a robot, one workpiece (fit-in workpiece) is held by the robot and inserted into a predetermined portion (normally a concave portion) of the other workpiece (receiving workpiece). A force-controlled robot is often adopted as the robot for holding the fit-in workpiece.

A force-controlled robot is preferably adopted for the fitting operation since it has a function of absorbing fluctuation in relative position and orientation between a fit-in workpiece and a receiving workpiece, and controlling force or moment acting between the workpieces on predetermined conditions. However, even when the force-controlled robot is used for automation of the fitting operation, the following items (1) and (2) have to be settled for performing the fitting operation with high reliability.

(1) Determination of relative position and orientation between a fit-in workpiece and a receiving workpiece (e.g., assembling parts)

Generally, fitting operation with a force-controlled robot is performed through the steps of (i) holding a fit-in workpiece, which has been positioned at a predetermined holding position, by a robot hand fixed to a force sensor, (ii) moving the robot to a predetermined approach position (an inserting action start position) and positioning it at the position, (iii) making the robot perform a force-controlled inserting action, and (iv) releasing the holding of the fit-in workpiece by the robot hand and making the robot retreat.

The relative position and orientation between the fit-in workpiece and the receiving workpiece after the completion of approaching action in step (ii) is important. At that time, if the relative position and orientation between the workpieces is not suitable for starting the inserting action, it is difficult to smoothly perform the inserting action in step (iii). In particular, when an insert portion (convex portion) of the fit-in workpiece and a receiving portion (concave portion) of the receiving workpiece are in tight relation in size and shape, the relative position and orientation need to be adjusted at a high degree. Further, when the holding state of the workpiece in step (i) (the position and orientation of the workpiece relative to the robot hand which is fixed to the force sensor) is not normal, the performance of the force control based on an output of the force sensor drops so that the inserting action is not performed smoothly.

Conventionally, the following measures are taken against the above problems:

a) Using a jig for positioning a receiving workpiece with high precision.

b) Using a hand (end effector) which can hold a fit-in workpiece regularly with high reproducibility.

c) Correcting the position and orientation of a robot using a visual sensor.

Even when the above measure a) is adopted, a workpiece may not be positioned with high precision if the workpiece has a casting surface of low shaping precision. Further, even when the above measure b) is adopted, a fit-in workpiece is apt to be held with an inexact orientation if the shaping precision of the workpiece is low. The above measure c) of correcting the position and orientation of a robot using a visual sensor is known as a general technique. However, such technique is not known that the relative position/orientation between an object held by a robot and an object placed apart from the robot is detected and adjustment of the relative position/orientation of the objects is assured prior to a force-controlled fitting action which requires the positioning with high precision.

(2) Confirmation of the fitting operation after it has done

Even if precision of the operation is made higher by taking the measures a) to c), it is virtually impossible to prevent an occurrence of an abnormal inserting action perfectly. Therefore, in order to increase the reliability of the system, it is necessary to discriminate whether or not an inserting action is normally done.

Conventionally, the discrimination of the normality/abnormality of the inserting action is made based on information such as a force sensor output, a torque output of each axis, a moving amount of a robot hand tip point indirectly obtained by outputs from pulse coders of respective axes during the inserting action. For example, if a force sensor output or a torque output of each axis shows an abnormal value during an inserting action, it is discriminated that a fit-in workpiece receives a large reactive force exceeding a normal value from a receiving workpiece, and if a moving amount of a robot hand tip point after a start of insertion is smaller than a predetermined insertion length, it is discriminated that an obstruction has occurred during the inserting action.

The discriminating method using a force sensor output and a torque output of each axis during an inserting action is merely an indirect method, so that it is not completely certain. For example, when the holding state of a fit-in workpiece is affected by a reactive force from a receiving workpiece and deviates from a normal state so that an insertion is performed imperfectly, it may be discriminated "normal".

In the method of detecting a moving amount of a hand tip point from outputs of the pulse coders of respective axes, as detection error due to elastic deformations of respective mechanical parts of a robot by a reactive force from a receiving workpiece is not negligible, it is difficult to correctly discriminate whether or not an insertion of an intended insertion length has been actually done.

SUMMARY OF THE INVENTION

An object of the present invention is to provide a force-controlled robot system capable of adjusting relative position and orientation between a fit-in workpiece and a receiving work piece prior to a force-controlled inserting action in order to smoothly perform the inserting action. Another object of the present invention is to provide a force-controlled robot system capable of immediately discriminating whether or not the inserting action has carried out normally utilizing a function of the visual sensor after the inserting action.

A force-controlled robot system according to the present invention has a robot having a robot hand for holding a first workpiece and a force sensor for detecting force applied to the first workpiece held by the robot hand, a visual sensor for obtaining image data for obtaining relative position/orientation between the first workpiece and a second workpiece, and a control means for controlling the robot and the visual sensor.

The control means includes a fitting action performing means for making the first workpiece held by the robot hand approach the second workpiece and performing a fitting action under force control based on an output from the force sensor, and a correcting means for obtaining workpiece position/orientation data representing the relative position/orientation between the first workpiece and the second workpiece based on image data obtained by the visual sensor, and for correcting position and orientation of the robot based on the obtained workpiece position/orientation data, in advance of the fitting action.

The control means further includes a discriminating means for obtaining fitting state data representing fitting state of the first workpiece in the second workpiece based on image data of the first and second workpieces obtained by the visual sensor and discriminating whether or not the fitting state is normal based on the obtained fitting state data after completing the fitting action.

The correcting means may obtain the workpiece position/orientation data based on both of image data of the first workpiece and image data of the second workpiece obtained by the visual sensor.

In a typical embodiment, the correcting means corrects position and orientation of the robot based on comparison between the obtained workpiece position/orientation data and workpiece position/orientation data taught in advance to the control means. In a preferred embodiment, the correcting means obtains the workpiece position/orientation data based on at least one of image data of the first workpiece and image data of the second workpiece obtained at a holding state detecting position which is set in the vicinity of a position where the fitting action is started, and corrects position and orientation of the robot at the fitting action starting position.

BRIEF DESCRIPTION OF DRAWINGS

FIG. 2a is a schematic diagram showing principal part of a structured light unit SU;

FIG. 2b is a schematic diagram showing how a structured light is formed;

DETAILED DESCRIPTION OF THE PREFERRED EMBODIMENTS

Figure 1:
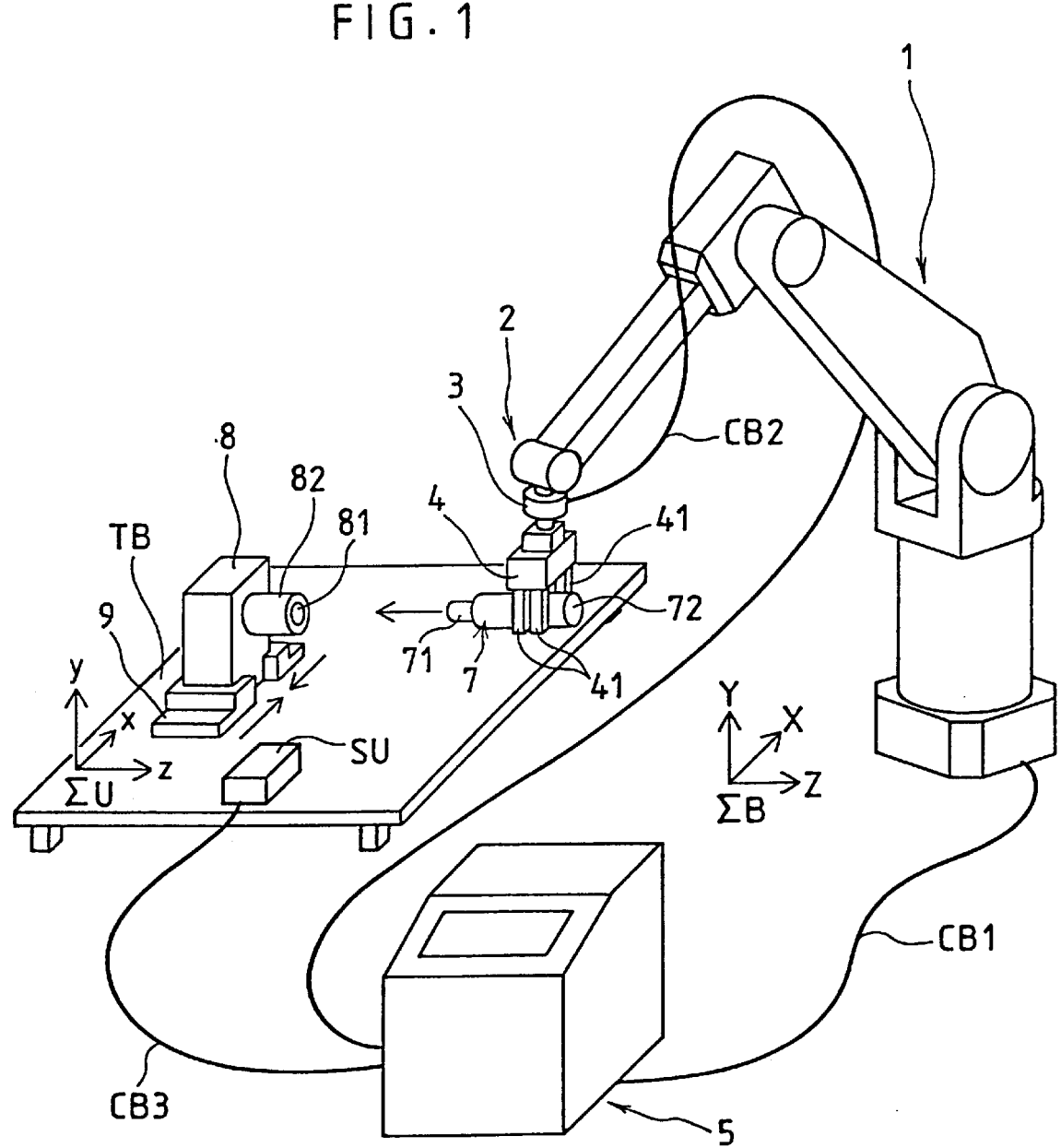
FIG. 1 is a perspective view schematically showing an entire arrangement for performing a fitting operation using a force-controlled robot system according to an embodiment of the present invention.

FIG. 1 schematically shows an entire arrangement for performing a fitting operation using a force-controlled robot system according to an embodiment of the present invention. In FIG. 1, a robot 1 is connected by a cable CB1 to a robot controller 5, and has a force sensor 3 attached to a wrist portion 2 thereof. The force sensor 3 comprises a bridge circuit including a strain gage etc., and detects force acting on a detecting portion of the force sensor 3 in 6 axis directions and transmit the result of detection through a cable CB2 to the robot controller 5 for the force control of the robot 1.

A hand 4 mounted/fixed to the force sensor 3 performs opening and closing of holding claws 41 at an appropriate robot position to hold a fit-in workpiece 7. The fit-in workpiece 7 in this embodiment is a stepped cylindrical assembly component having a convex portion 71 and a bottom face 72. On the other hand, a receiving workpiece 8 is an assembly component with a cylindrical portion 82 having a concave portion 81. The receiving workpiece 8 is supplied and positioned on a positioning device 9 placed on a work table TB. A symbol ΣU represents a work coordinate system fixed to the positioning device 9, which is set to the robot controller 5 in advance.

The positioning device 9 clamps the workpiece 8 in two directions (±X-axis directions or ±Z-axis directions) or in four directions (±X-axis directions and ±Z-axis directions), e.g. by a driving force of air cylinders (not shown), to fix the workpiece 8 on a plane parallel to the table TB. The drive control of the air cylinders may be performed by the robot controller 5.

The concave portion 81 of the receiving workpiece 8 is formed to be concentric with the cylindrical portion 82, and has such dimensions as to tightly receive the convex portion 71 of the fit-in workpiece 7.

A structured light unit SU is connected by a cable CB3 to the robot controller 5, and constitutes a three-dimensional visual sensor together with the robot controller 5 having an image processing function in the system. The structured light unit SU is disposed on the table TB at a position such that a structured light (slit light) is appropriately projected onto the concave portion 81 of the receiving workpiece 8 and an end of the convex portion 71 of the fit-in workpiece 7 which has approached the concave portion 81. As described later, the structured light unit SU is used for correcting the position and orientation of the robot 1 before the inserting action thereof, and also used as an inserting action confirming means after the inserting action.

FIG. 2a schematically shows a principal structure of the structured light unit SU, and FIG. 2b shows how a structured light is formed. The structured light unit SU shown in FIG. 2a is designed to project a slit light as a structured light SL. A projecting section of the unit includes a laser oscillator 12, a cylindrical lens 13, a galvanometer 14 having a deflecting mirror and a projection window 11, and an image pick-up section includes a CCD camera 20 and an image pick-up window 21.

As shown in FIG. 2b, when the structured light unit SU receives a detection command from the robot controller 5, a laser beam is emitted from the laser oscillator 12 and converted by the cylindrical lens 13 to a slit light SL. The slit light SL is deflected by the galvanometer 14 in a direction in accordance with a command value indicating a projecting direction, and projected through the projection window 11 onto a measuring object 16. An image including a bright line 15 formed on the measuring object 16 is picked up by the CCD camera 20 and taken in the robot controller 5 including an image processor.

The robot controller 5 analyzes the image including a bright line by an image processing function to obtain three-dimensional positions of end points 151, 152, etc. of the bright line 15. The principle of obtaining the three dimensional positions of end points 151, 152 etc., a calibration method and a related calculation process are well-known and therefore the detailed explanation thereof is omitted.

Figure 3:
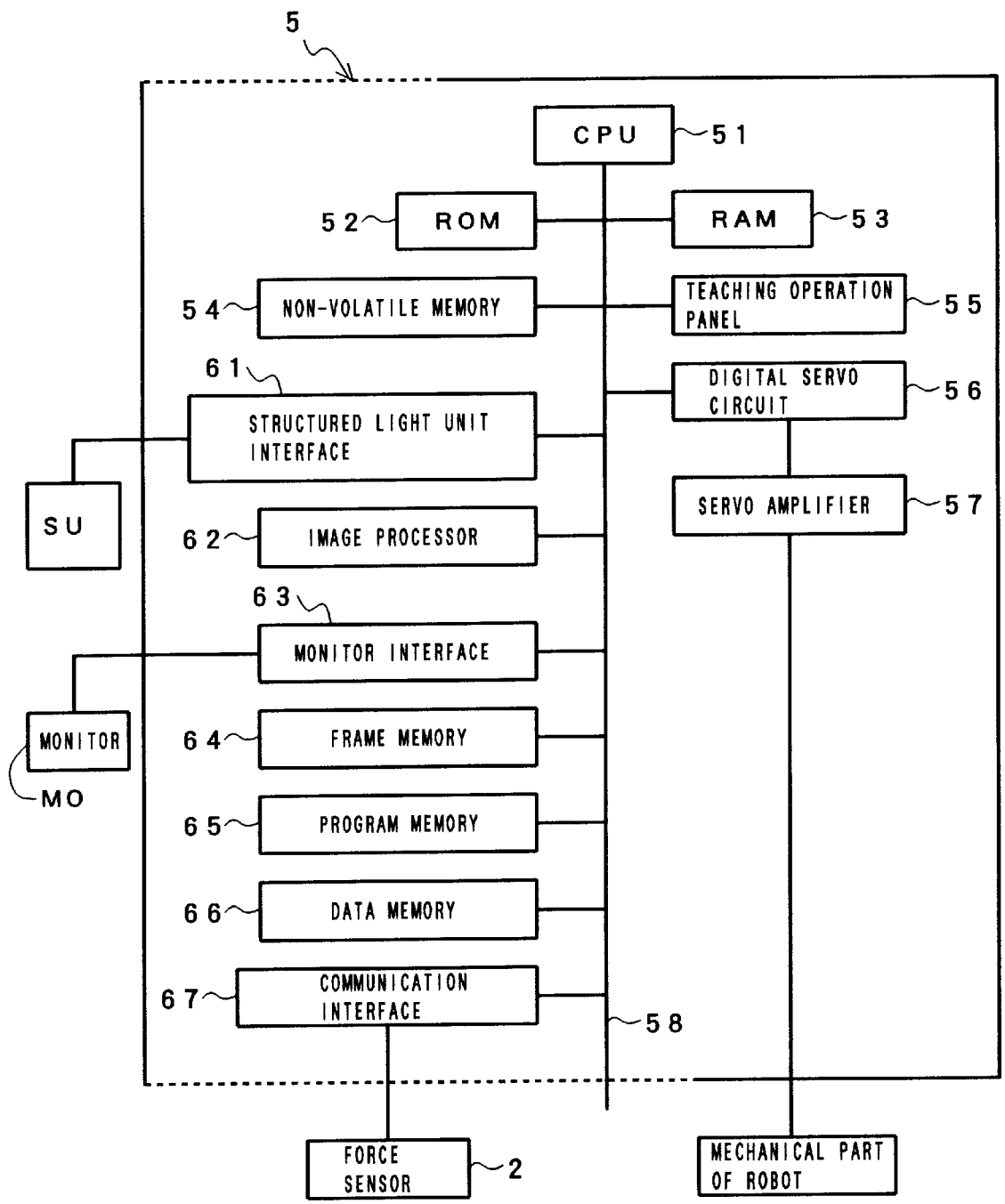
FIG. 3 is a block diagram showing structure of a robot controller as a control means for controlling the entire robot system and connecting state with other system components.

FIG. 3 shows internal architecture of the robot controller 5 which provides means for controlling the entire system, and connection with other system components. The robot controller 5 is of a type having an image processor, and has a central processing unit (CPU) 51. The CPU 51 is connected to a memory 52 in the form of ROM, a memory 53 in the form of RAM, a non-volatile memory 54, a teaching operation panel 55 with a liquid crystal display, a digital servo circuit 56 for controlling each axis of a robot, a structured light unit interface 61, an image processor 62, a monitor interface 63, a frame memory 64, a program memory 65, a data memory 66 and a general interface 67 through a bus 58.

The digital servo circuit 56 is connected through a servo amplifier 57 to a mechanical part of a robot RB in order to control each axis of the robot 1. The structured light unit interface 61 is connected to the above described structured light unit SU, and the monitor interface 63 is connected to a monitor display MO in the form of CRT, for example. A variety of external devices can be connected to the general interface 67, when necessary. In this embodiment, although a force sensor 3 is connected, air cylinders of the above described positioning device 9 may be connected.

The ROM 52 stores a system program necessary for controlling respective parts of the system. The RAM 53 is used for temporary storage of data and calculation. The non-volatile memory 54 stores data of operation programs providing operation commands for external devices such as the robot RB, the structured light unit SU, the force sensor 2, etc., set data of various coordinate systems (a work coordinate system $\Sigma U$, a force sensor coordinate system, etc.), calibration data for three-dimensional visual sensor (data used for converting the output of the three-dimensional visual sensor expressed in the sensor coordinate system $\Sigma S$ into position and orientation data in a robot coordinate system), related set values, and so forth.

The structured light unit interface 61 is used when commands for controlling respective parts of the structured light unit SU are transmitted and when images picked up by the CCD camera 20 (see FIG. 2) are taken in. The images taken in the robot controller 5 are converted to gray scale, and once stored in the frame memory 64. The images stored in the frame memory 64 are ready to be displayed on the monitor display MO.

The program memory 65 stores programs for image processing and analysis using the image processor 62, and the data memory 66 stores set data related to the image processing and analysis, and so forth. The following data 1) and 2) are stored in the memory according to the characteristics of the present invention. Processing according to the above mentioned programs will be described later.

1) Program data prescribing processes for obtaining position and orientation of the convex portion 71 of the fit-in workpiece 7 and the concave portion 81 of the receiving workpiece 81 in order to correct position and orientation of the robot 1 before starting the inserting action, and the related set data.

2) Program data prescribing processes for discriminating whether or not the inserting action has been performed normally after the robot 1 completes the inserting action, and the related set data.

Based on the above premise, the process of performing fitting operation in the present embodiment will be described together with the related precessing.

[1] Teaching of a fitting operation to the robot

Figure 4:
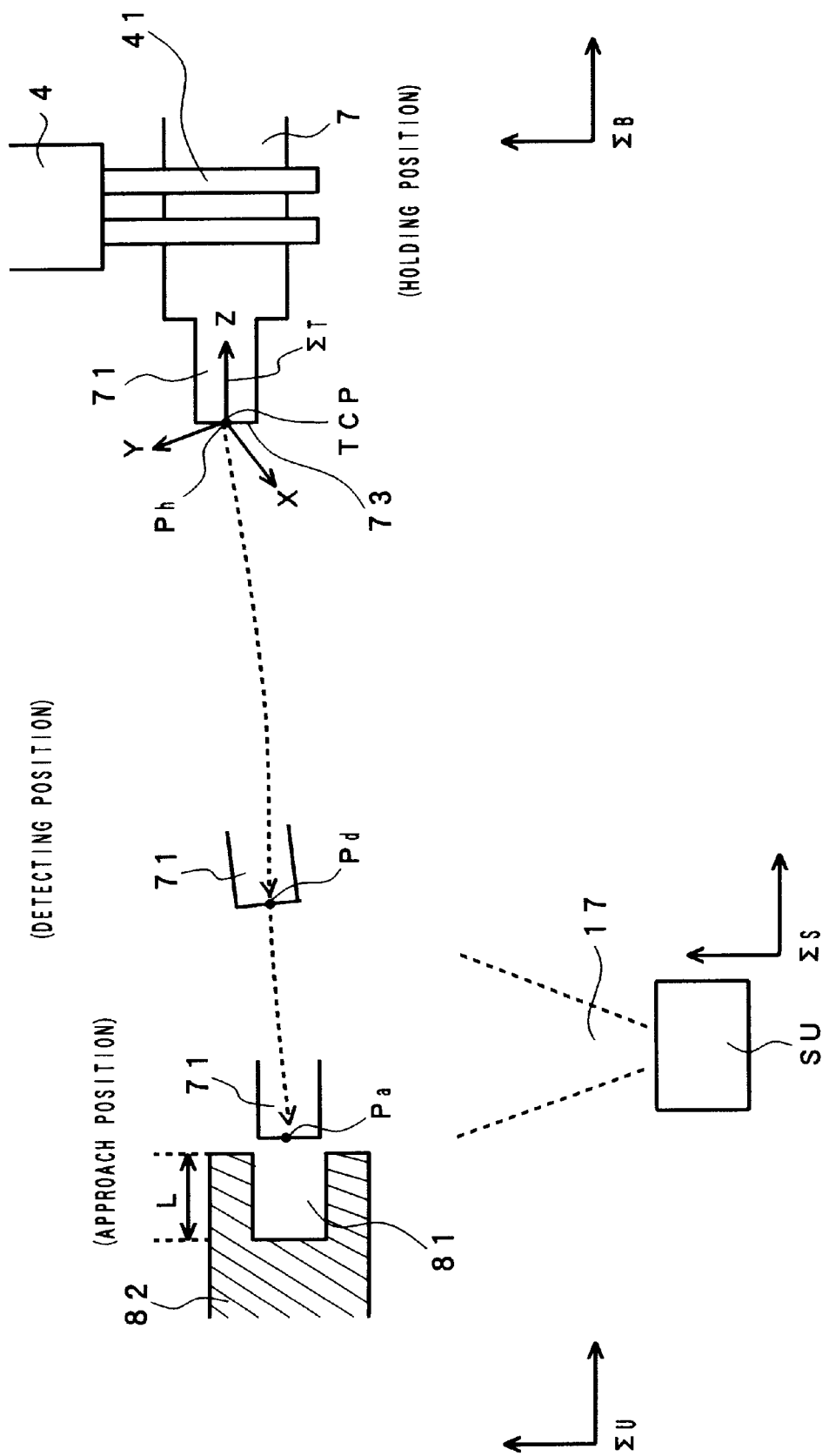
FIG. 4 is a schematic diagram for showing the essential points of teaching to the robot controller.

A fitting operation is taught in order to make the robot 1 perform fitting operation on a plurality of paired workpieces 7 and 8 by repeating a playback operation according to an operation program. Summary of teaching will be described below referring to FIG. 4. A tool coordinate system $\Sigma T$ is set such that an origin thereof coincides with a center point (TCP) of a tip face 73 of a fit-in workpiece 7 which is held by a hand 4 according to the teaching, and the direction of a cylinder axis of the fit-in workpiece 7 coincides with the direction of Z-axis.

1) A holding position Ph (including an orientation, which will apply hereinafter) is taught for holding by a hand 4 a fit-in workpiece 7 (a master workpiece for teaching) supplied at a predetermined supply position with a predetermined orientation. A matrix representing the taught holding position in a base coordinate system $\Sigma B$ is denoted by H.

2) A holding action by the hand 4 (an action of opening claws 41) is taught.

3) A holding state detecting position Pd selected within a range 17 which is suitable for position measurement (slit light projection) by a structured light unit SU is taught. A matrix representing the taught holding state detecting position Pd in the base coordinate system $\Sigma B$ is denoted by D. It is to be noted that the structured light unit SU is disposed at such position that is also suitable for discriminating whether or not the inserting action is normally done (which will be described later). Therefore, the holding state detecting position Pd is selected so that it is not far from a concave portion 81 of a receiving workpiece 8, and so that the structured light unit SU can detect image data on a convex portion 71 of the fit-in workpiece 7.

4) Conditions of movement from the holding position Ph to the holding state detecting position Pd are designated. In the present example, "movement by respective axes" and "positioning ratio 100% (stopping at the position Pd)" are designated. Also an appropriate speed is designated.

5) An approach position Pa suitable for starting an action of inserting the convex portion 71 into the concave portion 81 is taught. A matrix representing the taught approach position is denoted by A. The approach position Pa is taught as position and orientation of the robot in which the convex portion 71 faces and in alignment with the concave portion 81 on condition that the positioning of the receiving workpiece 8 and the holding of the fit-in workpiece 7 are in an ideal state.

6) Conditions of movement from the holding state detecting position Pd to the approach position Pa are designated. In the present example, "straight-line movement" and "positioning ratio 100% (complete stopping at the position Pa)" are designated. It is to be noted that the moving action is corrected by an approach action correction, as described later.

7) Conditions of force-controlled inserting action are designated. The conditions to be taught are as follows:

(i) Force control is made effective only on a force Fz of Z-axis direction in the tool coordinate system $\Sigma T$. The magnitude of a target force is designated appropriately by tuning. Force control is ineffective in the X-axis direction, in the Y-axis direction, around the X-axis, around the Y-axis and around the Z-axis. A motion command containing these components is not outputted to the servo system (these components are maintained as they are at the approach position).

(ii) An insertion length L is designated. The insertion length L is designated through manual input according to design data.

(iii) An index is set for discriminating whether or not an inserting action is completed. In this example, a reference value t0 is set for time passed after a start of an inserting action. The time passed after a start of an inserting action is measured and used as an index for discriminating whether or not the inserting action is completed together with the insertion length L. Specifically, when at least one of the movement of distance L and the elapse of time t0 measured from the start of an approach action is detected, the robot is stopped and the force control is ceased.

8) An action of ceasing the holding by hand 4 (an action of opening the claws 41) and a retreat action of the robot. As a robot retreat point, a position suitable for the next operation cycle is taught (not shown in the drawings).

[2] Teaching of detecting actions by the three-dimensional visual sensor

Commands for performing detecting actions by the three-dimensional visual sensor are written in the operation program. The taught detecting actions and timing for the actions are as follows:

1) Detection of the position and orientation of the convex portion 71 of the workpiece 7 held by the robot 1. The detection is performed between the time when the robot 1 is positioned at the holding state detecting position Pd and the time when the approach action is started. In the present example, the detection is performed immediately after the robot 1 is positioned at the holding state detecting position Pd.

2) Detection of the position and orientation of the concave portion 81 of the receiving workpiece 8. The detection is performed at any time after the positioning of the receiving workpiece 8 by the positioning device 9 is completed and before the approach action of the robot 1 is started. In the present example, the detection is performed immediately after the detection of position and orientation of the convex portion 71 as described at the item 1) is completed.

3) Detection for determining whether or not the inserting action by the robot 1 is normal. In this example, the position and orientation of a rear face 72 of the fit-in workpiece 7 is detected, as described later. The detection is performed immediately after the robot 1 ceases the holding of the workpiece 7 and retreats to the retreat position.

Figure 5:
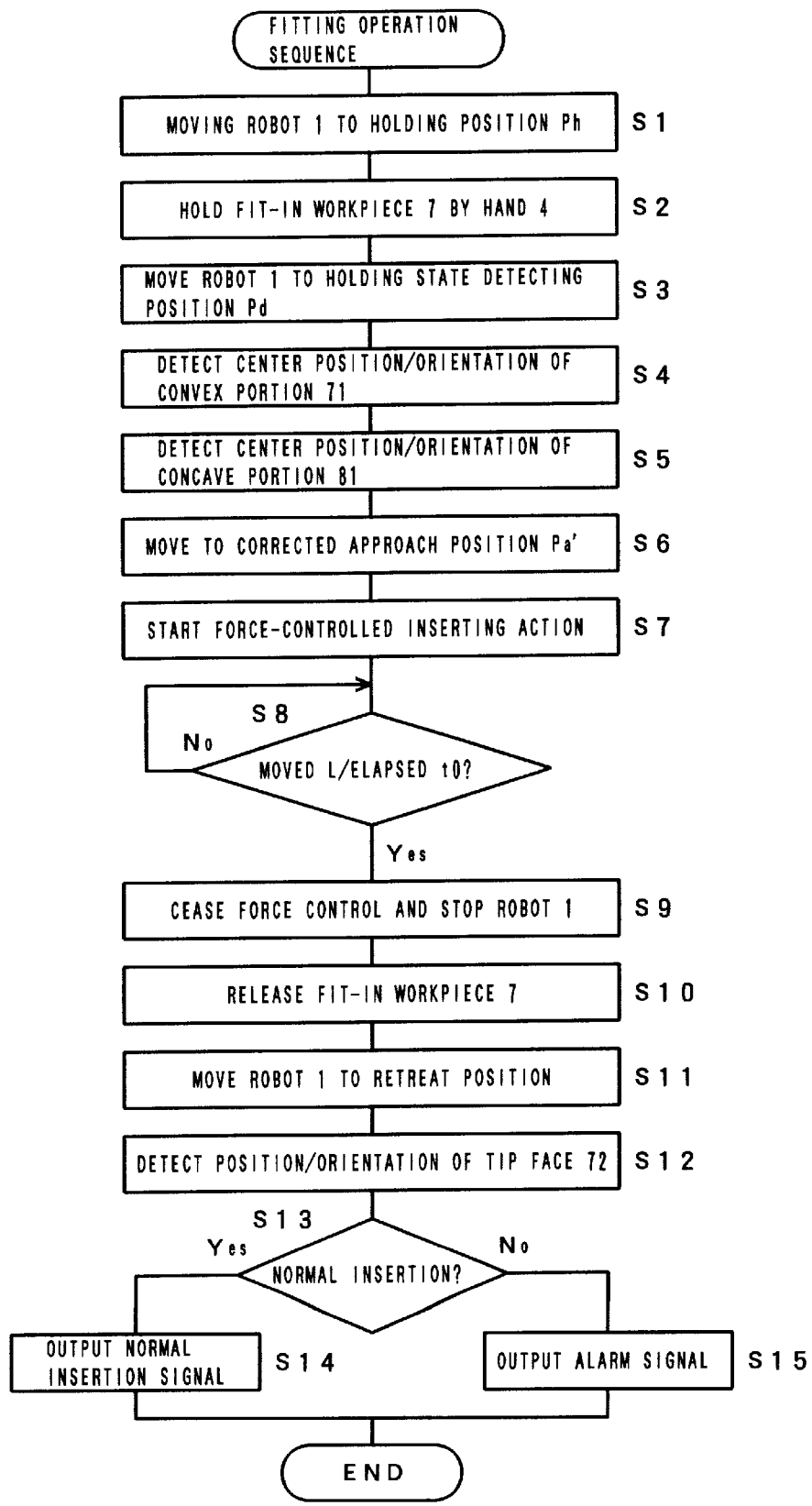
FIG. 5 is a flowchart showing a sequence for one cycle of fitting operation which is carried out by a playback operation.

FIG. 5 is a flowchart showing a sequence of one cycle of the fitting operation which is performed by a playback operation after the teaching is completed in the above described manner. Each Step S1–S15 is breifly described as follows:

Step S1: Moving the robot 1 from a waiting position to the taught holding position Ph and positioning the robot there.

Step S2: Holding the fit-in workpiece 7 by an opening action of the claws 41 of the hand 4.

Step S3: Moving the robot 1 to the taught holding state detecting position Pd and positioning the robot 1 there.

Step S4: Detecting the position and orientation of the convex portion 71 of the fit-in workpiece 7 held by the robot 1. The way of detection will be described later.

Step S5: Detecting the position and orientation of the concave portion 81 of the receiving workpiece 8.

Step S6: Moving the robot 1 to a corrected approach position Pa' which is determined by correcting the taught approach position Pa based on the results of detection at Steps S4 and S5.

Step S7: Starting a force-controlled inserting action. Since the details of the force-controlled inserting action are generally known, the explanation thereof is omitted. In this example, an impedance control of the robot is performed in accordance with the above described manner. Thus, the robot 1 moves in the Z-axis direction and at the same time comes to the state of outputting the designated target force Fz in the Z-axis direction.

Step S8: Waiting for detection of the movement of distance L or the elapse of time t0 measured from the start of an approach action.

Step S9: Stopping the robot and ceasing the force control.

Step S10: Releasing the fit-in workpiece 7 from the holding by an opening action of the claws 41 of the hand 4.

Step S11: Retreat the robot 1 to the taught retreat position.

Step S12: Detecting the position and orientation of the bottom face 72 of the fit-in workpiece 7 held by the robot 1.

Step S13: Discriminating whether or not the insertion state of the convex portion 71 in the concave portion 81 is normal.

Step S14: Outputting a signal indicative of a normal insertion state if the insertion state is normal. Based thereon, an indication such as "normal insertion" is displayed on the display screen of the teaching operation panel 55.

Step S15: Outputting an alarm signal indicative of an abnormal insertion state if the insertion state is not normal. Based thereon, an indication such as "abnormal insertion" is displayed on the display screen of the teaching operation panel 55 and also an alarm sound is made, to brought the system to an emergency stop.

The following is a supplementary description on the detection by the three-dimensional visual sensor, and the correction of the robot action and the discrimination on the insertion state based on the detection, which are contained in the above sequence.

[I] Detection of position and orientation of the convex portion 71 of the fit-in workpiece 7 (Step S4)

Figure 6:
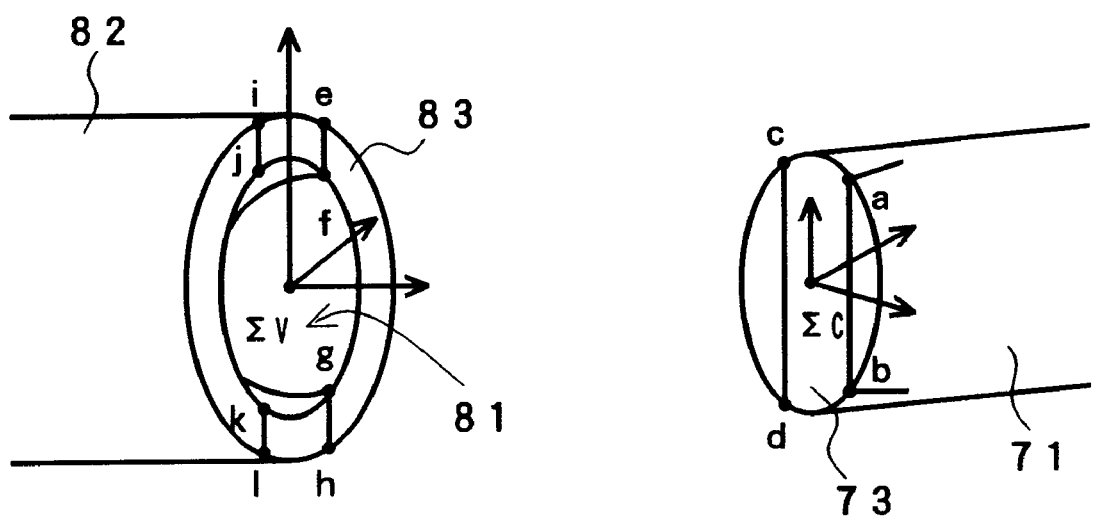
FIG. 6 is a schematic diagram for showing detection of position and orientation of a convex portion of a fit-in workpiece and detection of position and orientation of a concave portion of a receiving workpiece.
Figure 6:
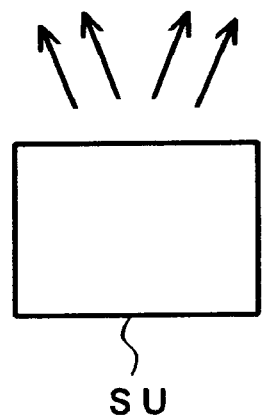

As shown in FIG. 6, a slit light is projected some times (in this example, two times) from the projecting section of the structured light unit SU to form bright lines ab and cd on the end face 73 of the fit-in workpiece 7, successively. The images of the bright lines ab and cd are picked up by the camera of the structured light unit SU. The obtained images are analyzed in the robot controller 5 to obtain the three-dimensional positions of the end points a, b, c and d of the bright lines ab and cd. From the positions of those four points, a center position and an orientation of the circular face 73 is obtained by least square approximation, for example. A coordinate system fixed to the center of the circular face 73 is denoted by $\Sigma C$. A matrix (data in the sensor coordinate system $\Sigma S$) representing the position and orientation of the coordinate system $\Sigma C$ obtained from sensor output during a playback operation (actual operation) is denoted by C'.

The similar detection is performed in teaching the detecting action by the three-dimensional visual sensor, as described before. Referring to the above described definition of the tool coordinate system $\Sigma T$, the position and orientation of the convex portion 71 at the time of teaching the holding state detection position is equivalent to the position and orientation of the tool coordinate system $\Sigma T$. A matrix (sensor output) representing that position and orientation of the tool coordinate system $\Sigma T$ in the sensor coordinate system $\Sigma S$ is denoted by C.

[II] Detection of the position and orientation of the concave portion 81 of the receiving workpiece 8 (Step S5)

As in the detection of the convex portion 71, a slit light is projected some times (in this example, two times) from the projecting section of the structured light unit SU as shown in FIG. 6 to form bright lines ef, gh and bright lines ij, kl on the edge face 83 of the cylindrical portion 82, successively. The images of those bright lines are picked up by the camera of the structured light unit SU. The obtained images are analyzed in the robot controller 5 so that the three-dimensional positions of the inside end points f, g, j and k of the respective bright lines are obtained. From the positions of those four points, a center position and an orientation of the circular opening of the concave portion 81 is obtained by least square approximation, for example. A coordinate system fixed to the center of the circular opening is denoted by $\Sigma V$, and a matrix (data in the sensor coordinate system $\Sigma S$) representing the position and orientation of the coordinate system $\Sigma V$ obtained from sensor output during a playback operation (actual operation) is denoted by V'.

The similar detection is performed in teaching the detecting action by the three-dimensional visual sensor, as described before. A matrix (sensor output) representing the position and orientation of the coordinate system $\Sigma V$, which expresses the position and orientation of the concave portion 81, at the time of teaching in the sensor coordinate system $\Sigma S$ is denoted by V.

[III] How to obtain the corrected approach position A' (Step S6)

First, correction of deviation in position and orientation of the concave portion 81 will be explained.

In addition to the above described homogeneous transformation matrices, homogeneous transformation matrices defined as follows are used. Data corresponding to those definitions are stored as designated data on each coordinate system in the non-volatile memory 54 in the robot controller 5.

R: A matrix representing the position and orientation of a robot face plate coordinate system $\Sigma F$ in the base coordinate system $\Sigma B$.

T: A matrix representing the position and orientation of the tool coordinate system $\Sigma T$ in the face plate coordinate system $\Sigma F$.

U: A matrix representing the position and orientation of the work coordinate system $\Sigma U$ in the base coordinate system $\Sigma B$.

P: A matrix representing the position and orientation of the taught point (holding orientation detecting position Pd) in the work coordinate system $\Sigma U$.

At the time the robot reaches the taught holding state detecting position Pd, the following expression (1) holds true:

$$R \cdot T = U \cdot P \qquad (1)$$

Therefore, the position of the robot face plate at that time is given according to the following expression (2):

$$R = U \cdot P \cdot T^{-1} \qquad (2)$$

Here, if the position of the face plate corresponding to the corrected position of the TCP which compensates deviation in position and orientation of the concave portion 81 is denoted by R', the following expression (3) holds true:

$$R' \cdot T = U \cdot \Delta U \cdot P \qquad (3)$$

Since the left side represents the position of the TCP after the correction for compensating the deviation in position and orientation of the concave portion 81, it is necessary for caryying out the correction to obtain $\Delta U$ in the expression (3).

Now, providing that a matrix representing the coordinate system $\Sigma V$ (the center position and orientation of the opening of the concave portion) in the work coordinate system $\Sigma U$ is denoted by Q (unknown fixed matrix) and a matrix representing the position and orientation of the sensor coordinate system $\Sigma S$ in the base coordinate system $\Sigma B$ is denoted by S, the following expressions (4) and (5) is held at the time of teaching and at the time of actual measurement (playback operation), respectively.

At the time of teaching;

$$U \cdot Q = S \cdot V \qquad (4)$$

At the time of actual measurement;

$$U \cdot \Delta U \cdot Q = S \cdot V' \qquad (5)$$

From those expressions, $$\Delta U = U^{-1} \cdot S \cdot V' \cdot (U^{-1} \cdot S \cdot V)^{-1} \qquad (6)$$
$$= U^{-1} \cdot S \cdot V' \cdot V^{-1} \cdot S^{-1} \cdot U$$

On the right side of the expression (6), data on U, S and V are taught to the robot controller, and V' is obtained at Step S5. Therefore, $\Delta U$ can be obtained in the robot controller.

Next, correction of deviation in position and orientation of the convex portion 71 will be explained.

As described above, at the time the robot reaches the taught holding state detection position, the above expression (1) is held, and the position of the robot face plate at that time is given by the above expression (2).

Here, providing that the position of the face plate coordinate with the position of the TCP after the correction for compensating the deviation in position and orientation of the convex portion 71 is denoted by R", the following expression (7) is held as in the case of the concave portion 81:

$$R'' \cdot T \cdot \Delta T = U \cdot P \qquad (7)$$

Therefore, $$R'' \cdot T = U \cdot P \cdot \Delta T^{-1} \qquad (8)$$

Since the left side of the expression (8) represents the position of the TCP after the correction for compensating the deviation in position and orientation of the convex portion 71, it is necessary for carrying out the correction to obtain $\Delta T$ in the expression (8).

Now, providing that a matrix representing the coordinate system $\Sigma C$ (the center position and orientation of the tip end face of the convex portion) in the tool coordinate system $\Sigma T$ (unknown fixed matrix) is denoted by M, the following expressions (9) and (10) are held at the time of teaching and at the time of actual measurement (playback operation), respectively.

At the time of teaching;

$$R \cdot T \cdot M = S \cdot C \qquad (9)$$

At the time of actual measurement;

$$R \cdot T \cdot \Delta T \cdot M = S \cdot C' \qquad (10)$$

From those expressions, $$\Delta T = T^{-1} \cdot R^{-1} \cdot S \cdot C''(T^{-1} \cdot R^{-1} \cdot S \cdot C)^{-1} \quad (11)$$
$$= T^{-1} \cdot R^{-1} \cdot S \cdot C' \cdot C^{-1} \cdot S^{-1} \cdot R \cdot T$$

On the right side of the expression (11), data on T, R, S and C are taught to the robot controller, and C' is obtained at Step S4. Therefore, $\Delta T$ can be obtained in the robot controller.

3) The way of correcting both of deviation in position and orientation of the concave portion 81 and deviation in position and orientation of the convex portion 71 will be explained.

Deviation in position and orientation of the concave portion 81 and deviation in position and orientation of the convex portion 71 can be both corrected using the $\Delta U$ and $\Delta T$ obtained by the above expressions (6) and (11).

Specifically, providing that the position of the face plate coordinate with the position of the TCP after the correction for compensating both deviations is denoted by RCR, the following expression (12) holds true:

$$RCR \cdot T \cdot \Delta T = U \cdot \Delta U \cdot P \quad (12)$$

As is clear from the expression (12), by making the following substitution with respect to the set data U on the work coordinate system $\Sigma U$ and the set data T on the tool coordinate system $\Sigma T$ using the results of the expressions (6) and (11), $$U \rightarrow U \cdot \Delta U$$
$$T \rightarrow T \cdot \Delta T,$$

the correction for compensating deviation in position and orientation of both the convex portion 71 and the concave portion 81 can be carried out. This applies also to the correction for compensating deviation in position and orientation of both the convex portion 71 and the concave portion 81 with respect to the approach position Pa. Therefore, if the face plate is shifted to the following position RA' which is obtained by substituting the approach position G in the work coordinate system $\Sigma U$ for the holding state detecting position P in the work coordinate system $\Sigma U$, the approach position Pa is corrected as Pa'.

$$RA' = U \cdot \Delta U \cdot G \cdot (T \cdot \Delta T)^{-1} \quad (13)$$

In the above equation, the matrix G can be calculated according to the following equation using the taught approach position Pa and the work coordinate system $\Sigma U$ in the base coordinate system $\Sigma B$.

$$G = U^{-1} \cdot A \quad (14)$$

(d) The way of discriminating whether or not the insertion state is normal (Steps S12/S13)

Figure 7:
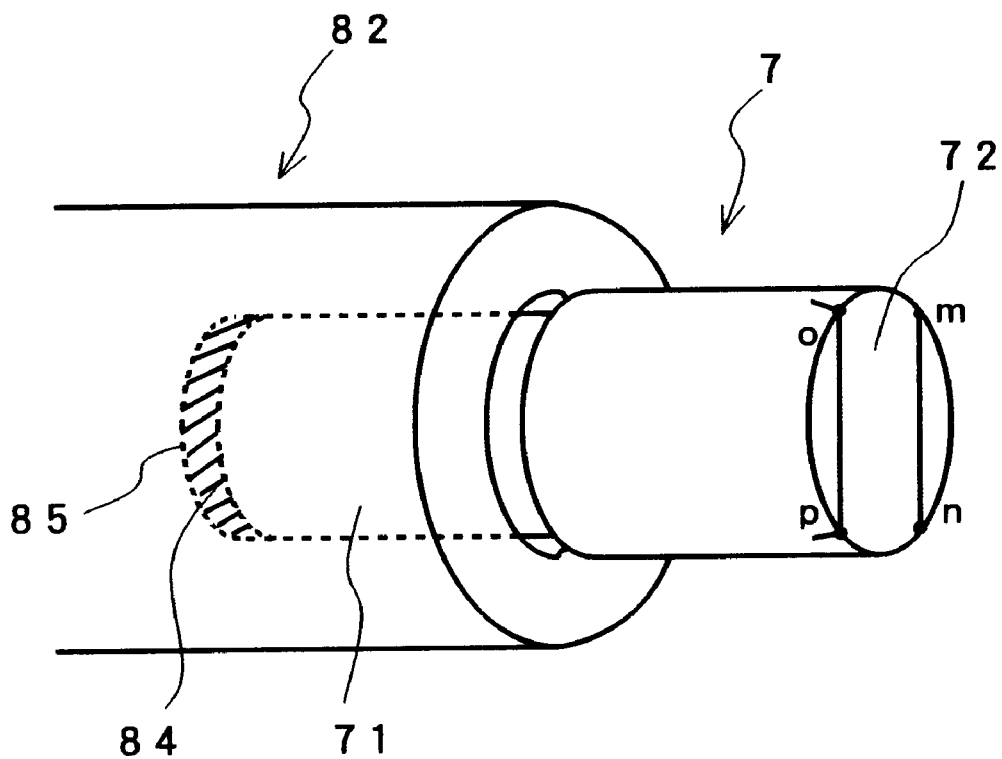
FIG. 7 is a schematic diagram for showing detection for discrimination on whether or not an inserting action is normal.
Figure 7:
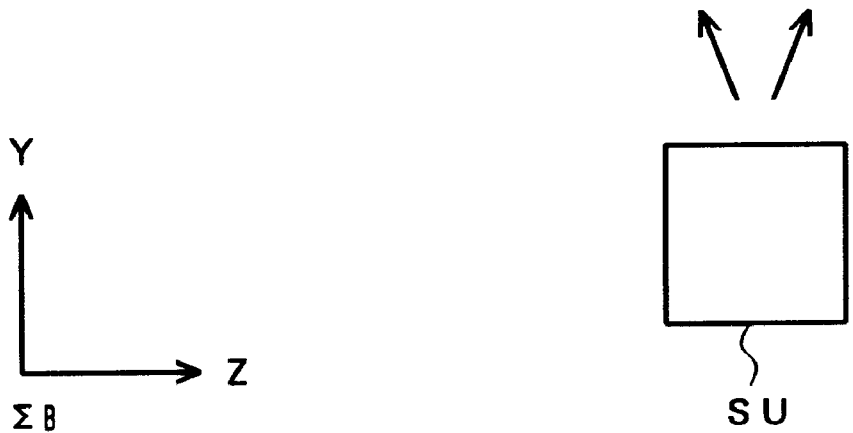

As shown in FIG. 7, a slit light is projected some times (in this example, two times) from the projecting section of the structured light unit SU to form bright lines mn and op on the tip face 72 of the fit-in workpiece 7, successively. The images of those bright lines are picked up by the camera of the structured light unit SU, successively. The obtained images are analyzed in the robot controller 5 to obtain the three-dimensional positions of the end points m, n, o and p of the respective bright lines.

Then, based on the Z-coordinate values of those positions (in the base coordinate system $\Sigma B$), it is discriminated whether or not the height of the bottom face 72 measured from the bottom 85 of the concave portion 81 (in the horizontal direction) is normal (the insertion length L is attained).

For example, an upper limit value Zmax is set for the Z-coordinate values of the end points m, n, o and p, and if at least one of the end points m, n, o and p exceeds the upper limit value Zmax, discrimination is made that the insertion is not normal. The abnormal insertion means, for example, cases such that a gap 84 larger than a predetermined value remains between the tip of the convex portion 71 inserted in the concave portion 81 and the bottom 85. Discrimination on normality of the insertion orientation can be made based on differences between the Z-coordinate values of the end points m, n, o and p.

In the present embodiment, the three-dimensional visual sensor is used as a visual sensor. In some cases, for example, in the case where a deviation of holding of the fit-in workpiece 7 is small and one direction component (for example, Y-direction component) of the position of the receiving workpiece 7 is regulated with high precision, a two-dimensional visual sensor can be used as a visual sensor. Needless to say, also in such cases, information about correction of the actions of the robot and information about whether the insertion state is normal or not are obtained.

According to the present invention, by additionally providing one visual sensor to a force-controlled robot system for performing the fitting operation, for use in correcting robot actions and in obtaining information as to whether an insertion state is normal or not, the fitting operation is automated with high reliability.

What is claimed is:

1. A force-controlled robot system for performing an operation of fitting a first workpiece into a second workpiece, comprising:
    a robot having a robot hand for holding the first workpiece and a force sensor for detecting force applied to the first workpiece held by said robot hand;
    a visual sensor for obtaining image data for obtaining relative position/orientation between said first workpiece and said second workpiece; and
    a control means for controlling said robot and said visual sensor, said control means including a fitting action performing means for making said first workpiece held by said robot hand approach said second workpiece and performing a fitting action under force control based on an output from said force sensor, and a correcting means for obtaining workpiece position/orientation data representing the relative position/orientation between said first workpiece and said second workpiece based on image data obtained by said visual sensor, and for correcting position and orientation of said robot based on the obtained workpiece position/orientation data, in advance of said fitting action.

2. A force-controlled robot system according to claim 1, wherein said correcting means obtains said workpiece position/orientation data based on both of image data of said first workpiece and image data of said second workpiece obtained by said visual sensor.

3. A force-controlled robot system for performing an operation of fitting a first workpiece into a second workpiece, comprising:
    a robot having a robot hand for holding the first workpiece and a force sensor for detecting force applied to the first workpiece held by said robot hand;

a visual sensor for obtaining image data for obtaining relative position/orientation between said first workpiece and said second workpiece; and a control means for controlling said robot and said visual sensor, said control means including a fitting action performing means for making said first workpiece held by said robot hand approach said second workpiece and performing a fitting action under force control based on an output from said force sensor, a correcting means for obtaining workpiece position/orientation data representing the relative position/orientation between said first workpiece and said second workpiece based on image data obtained by said visual sensor and for correcting position and orientation of said robot based on the obtained workpiece position/orientation data in advance of said fitting action, and a discriminating means for obtaining fitting state data representing fitting state of said first workpiece in said second workpiece based on image data of the first and second workpieces obtained by said visual sensor and discriminating whether or not the fitting state is normal based on the obtained fitting state data after completing said fitting action.

4. A force-controlled robot system according to claim 3, wherein said correcting means obtains said workpiece position/orientation data based on both of image data of said first workpiece and image data of said second workpiece obtained by said visual sensor.

5. A force-controlled robot system according to claim 1 wherein said correcting means corrects position and orientation of said robot based on comparison between said obtained workpiece position/orientation data and workpiece position/orientation data taught in advance to said control means.

6. A force-controlled robot system according to claim 1 wherein said correcting means obtains said workpiece position/orientation data based on at least one of image data of said first workpiece and image data of said second workpiece obtained at a holding state detecting position which is set in the vicinity of a position where said fitting action starts, and corrects position and orientation of said robot at said fitting action starting position.

* * * * *